(12) United States Patent
Gu et al.

(10) Patent No.: US 8,858,055 B2
(45) Date of Patent: Oct. 14, 2014

(54) BACKLIGHT MODULE AND DISPLAY APPARATUS

(75) Inventors: Yubo Gu, Guangdong (CN); Pei Jia, Guangdong (CN); Liuyang Yang, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 160 days.

(21) Appl. No.: 13/697,770

(22) PCT Filed: Jul. 13, 2012

(86) PCT No.: PCT/CN2012/078637
§ 371 (c)(1),
(2), (4) Date: Nov. 13, 2012

(87) PCT Pub. No.: WO2013/170531
PCT Pub. Date: Nov. 21, 2013

(65) Prior Publication Data
US 2013/0308342 A1    Nov. 21, 2013

(51) Int. Cl.
| F21V 7/04 | (2006.01) |
| G09F 13/18 | (2006.01) |
| G09F 13/04 | (2006.01) |
| G02F 1/133 | (2006.01) |

(52) U.S. Cl.
CPC ............... *G09F 13/04* (2013.01); *G09F 13/18* (2013.01); *G02F 1/133* (2013.01)
USPC ........................... 362/613; 362/633; 362/632

(58) Field of Classification Search
USPC .................. 362/613, 611, 612, 615, 632, 633
See application file for complete search history.

(56) References Cited

U.S. PATENT DOCUMENTS

| 8,243,231 B2 * | 8/2012 | Hur et al. ........................ 349/65 |
| 2013/0250203 A1 * | 9/2013 | Zhou ............................... 349/58 |

\* cited by examiner

*Primary Examiner* — Vip Patel
(74) *Attorney, Agent, or Firm* — Kirton McConkie; Evan R. Witt

(57) ABSTRACT

The present invention provides a backlight module and a display apparatus. The display apparatus comprises the backlight module and a display panel. The backlight module comprises a back bezel, a light guide plate and a plurality of light sources. The back bezel includes a plurality of bezel convex portions and a plurality of corresponding bezel concave portions. The light guide plate includes a plurality of recesses, and the bezel convex portions of the back bezel are fitted into the recesses of the light guide plate. The light sources are disposed at one side of the light guide plate. The present invention can use the bezel concave portions of the back bezel to improve a heat-dissipation effect.

17 Claims, 3 Drawing Sheets

BACKLIGHT MODULE AND DISPLAY APPARATUS

FIELD OF THE INVENTION

The present invention relates to a backlight module and a display apparatus, and more particularly to a backlight module and a display apparatus capable of improving the heat dissipation efficiency thereof.

BACKGROUND OF THE INVENTION

Liquid crystal displays (LCDs) have been widely applied in electrical products. Currently, most LCDs are backlight type LCDs that comprise a liquid crystal panel and a backlight module. According to the position of the light sources for providing LCDs with backlight, the backlight module can be classified into a side-light type or a direct-light type.

A heat generated by the LCDs in a working status may deteriorate an efficiency thereof, thus the heat dissipation is very important to the LCDs. In the side-light type backlight module, the light sources, such as light emitting diodes (LEDs), are disposed at one side of a light guide plate. However, the heat of the LEDs tends to be accumulated at one side of the LCD, resulting in an uneven heat dissipation, as well as deteriorating a light efficiency of the LEDs and a display quality of the LCD.

As a result, it is necessary to provide a backlight module and a display apparatus to solve the problems existing in conventional technologies such as above-mentioned.

SUMMARY OF THE INVENTION

The present invention provides a backlight module and a display apparatus to solve a heat dissipation problem existing in a conventional backlight module.

A primary object of the present invention is to provide a backlight module, wherein the backlight module comprises: a back bezel having a first surface and a second surface opposite thereto, wherein the back bezel includes a plurality of bezel convex portions and a plurality of corresponding bezel concave portions, and the bezel convex portions are formed on the first surface, and the bezel concave portions are formed on the second surface; a light guide plate disposed on the first surface, wherein the light guide plate includes a plurality of recesses, the bezel convex portions of the back bezel are fitted into the recesses of the light guide plate; and a plurality of light sources disposed at one side of the light guide plate.

A secondary object of the present invention is to provide a backlight module, wherein the backlight module comprises: a back bezel having a first surface and a second surface opposite thereto, wherein the back bezel includes a plurality of bezel convex portions and a plurality of corresponding bezel concave portions, and the bezel convex portions are formed on the first surface, and the bezel concave portions are formed on the second surface; a light guide plate disposed on the first surface, wherein the light guide plate includes a plurality of recesses, the bezel convex portions of the back bezel are fitted into the recesses of the light guide plate; and a plurality of light sources disposed at one side of the light guide plate, wherein the recesses of the light guide plate are positioned between the light sources, and a width of each of the recesses is less than an interval between the light sources, and an angle between a side surface of each of the recesses and a light reflection surface is in a range of 90 degrees to 175 degrees.

A further object of the present invention is to provide a display apparatus, wherein the display apparatus comprises a display panel and a backlight module. The backlight module comprises: a back bezel having a first surface and a second surface opposite thereto, wherein the back bezel includes a plurality of bezel convex portions and a plurality of corresponding bezel concave portions, and the bezel convex portions are formed on the first surface, and the bezel concave portions are formed on the second surface; a light guide plate disposed on the first surface, wherein the light guide plate includes a plurality of recesses, the bezel convex portions of the back bezel are fitted into the recesses of the light guide plate; and a plurality of light sources disposed at one side of the light guide plate.

In one embodiment of the present invention, at least portions of the bezel concave portions are positioned in a high-temperature region of a temperature distribution diagram of the back bezel, and the temperature distribution diagram is predetermined before forming the bezel concave portions on the back bezel.

In one embodiment of the present invention, the light sources are disposed at a first side and a second side of the back bezel, and the bezel concave portions are arranged at the first side and the second side, and the bezel concave portions are arranged as triangular shapes.

In one embodiment of the present invention, an area, density or quantity of an arrangement of the bezel concave portions formed at the first side is less than an area, density or quantity of another arrangement of the bezel concave portions formed at the second side.

In one embodiment of the present invention, the recesses of the light guide plate are positioned between the light sources, and a width of each of the recesses is less than an interval between the light sources.

In one embodiment of the present invention, an angle between a side surface of each of the recesses and a light reflection surface is in a range of 90 degrees to 175 degrees.

In one embodiment of the present invention, the angle between the side surface of each of the recesses and the light reflection surface is in a range of 135 degrees to 165 degrees.

In one embodiment of the present invention, side surfaces of the recesses are obliquely flat surfaces or obliquely curved surfaces.

In one embodiment of the present invention, the light sources are disposed at one side of the back bezel, and the bezel concave portions are arranged as a triangular shape.

In comparison to the conventional backlight module having a heat concentration problem, with the use of the backlight module and the display apparatus of the present invention, the heat dissipation area in a partial region of the back bezel can be increased for efficiently dissipating the heat of the light source according to the positions of the light sources. Therefore, the heat-dissipation effect of the backlight module and the display apparatus of the present invention can be improved, thus homogenizing the temperature distribution and enhancing the display quality of the display apparatus. In addition, with the use of the recesses of the light guide plate, the light guide plate can be easily disposed and positioned on the back bezel, and a weight of the light guide plate can be reduced. Moreover, obliquely reflective surfaces can be formed on the recesses of the light guide plate to mitigate an uneven light distribution problem between the light sources, thereby enhancing a light distribution uniformity of the backlight module.

The structure and the technical means adopted by the present invention to achieve the above-mentioned and other objects can be best understood by referring to the following detailed description of the preferred embodiments and the accompanying drawings:

DETAILED DESCRIPTION OF THE PREFERRED EMBODIMENTS

Figure 1:
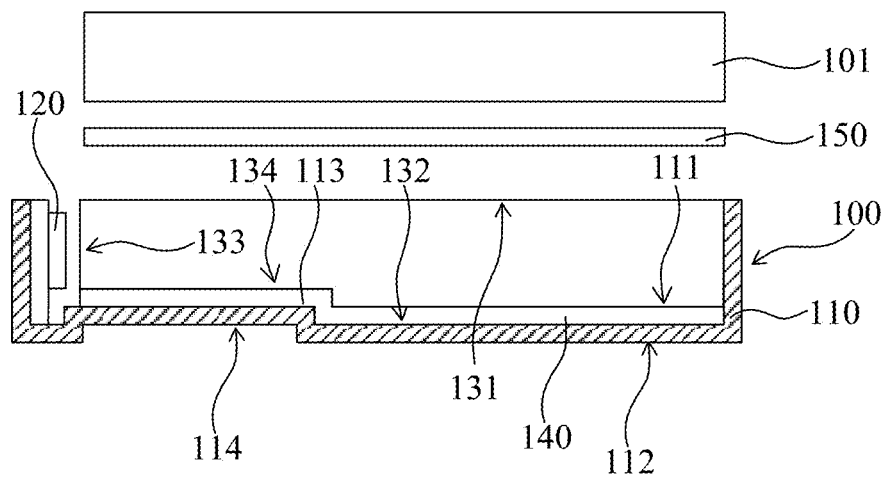
FIG. 1 is a schematic diagram showing a display apparatus according to an embodiment of the present invention.

The following embodiments are exemplified by referring to the accompanying drawings, for describing specific embodiments implemented by the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, like reference numerals indicate like components or items.

Referring to FIG. 1, FIG. 1 is a schematic diagram showing a display apparatus according to an embodiment of the present invention. In the present embodiment, the backlight module 100 may be a side-light type backlight module and disposed opposite to a display panel 101 (such as a liquid crystal display panel), thereby forming the display apparatus (such as an LCD apparatus). The backlight module 100 comprises a back bezel 110, a plurality of light sources 120, a light guide plate 130, a reflective layer 140 and at least one optical film 150. The back bezel 110 is configured to carry the light source 120, the light guide plate 130, the reflective layer 140 and the optical film 150. The light sources 120 are disposed at one side of the light guide plate 130 to emit light thereto for guiding the light to the display panel 101. The reflective layer 140 may be formed between the back bezel 110 and the light guide plate 130 for reflecting the light of the light sources 120. The optical film 150 is disposed above the light guide plate 130 for optical improvement.

Figure 2:
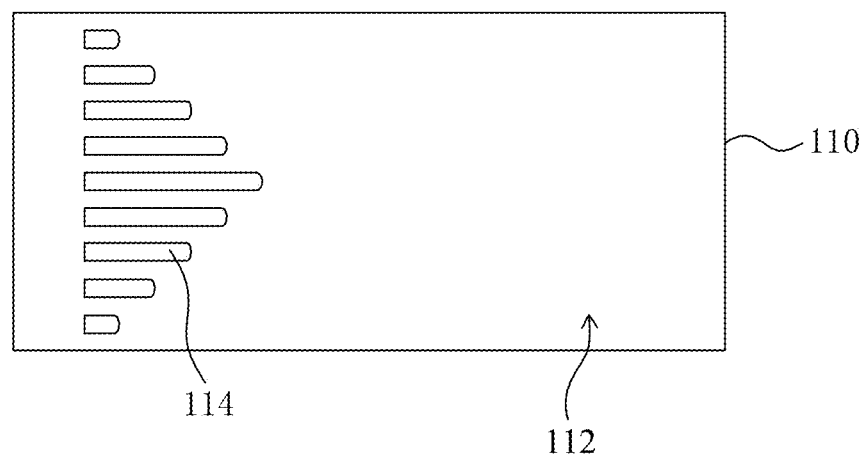
FIG. 2 is a bottom view showing a back bezel according to one embodiment of the present invention.
Figure 3:
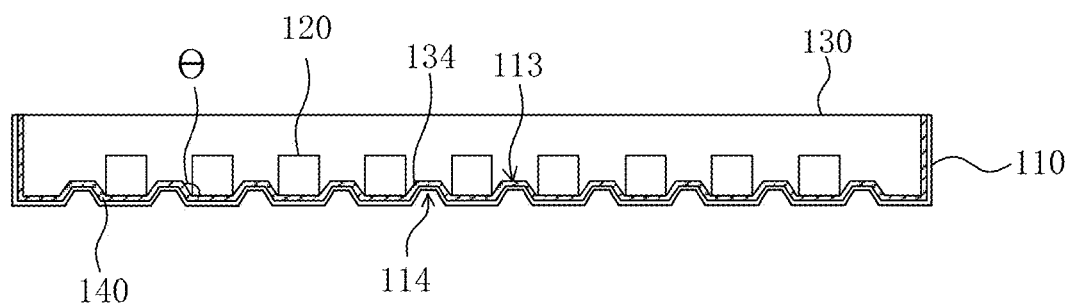
FIG. 3 is a cross-sectional view showing the back bezel according to one embodiment of the present invention.

Referring to FIG. 2 and FIG. 3, FIG. 2 is a bottom view showing a back bezel according to one embodiment of the present invention, and FIG. 3 is a cross-sectional view showing the back bezel according to one embodiment of the present invention. The back bezel 110 of the present embodiment may be made of an opaque material, such as plastic, metal or any combination material thereof. The material of the back bezel 110 is preferably a metal of a great thermal conductivity, such as Al. The back bezel 110 has a first surface 111 and a second surface 112 opposite thereto, wherein the back bezel 110 includes a plurality of bezel convex portions 113 and a plurality of corresponding bezel concave portions 114. The bezel convex portions 113 are formed on the first surface 111, and the bezel concave portions 114 are formed on the second surface 112 for increasing a heat dissipation area of the back bezel 110, thereby improving a heat dissipation effect of the back bezel 110. The bezel convex portions 113 and the corresponding bezel concave portions 114 may be formed as one-piece together with the back bezel 110 by extrusion molding, stamping, cutting, casting, machining, compression molding or forging. The bezel convex portions 113 may have various cross-sectional shapes, such as an arc, a triangle, a rectangle or any other shape. In this embodiment, the bezel convex portions 113 may be elongated convex portions (referring to FIG. 2). At least portions of the convex portions 113 are positioned in a high-temperature region of a temperature distribution diagram of the back bezel 110. The temperature distribution diagram is predetermined before forming the bezel convex portions 113 on the back bezel 110 for realizing the heat distribution of the back bezel 110. In general, the temperature in the high-temperature region is substantially greater than an average temperature of the back bezel 110 in working. The average temperature is an average of the highest temperature and the lowest temperature of the back bezel 110 in working.

Referring to FIG. 1 again, in the present embodiment, the light sources 120 may be light emitting diodes (LEDs) disposed on a circuit board 121, thereby forming a light bar. The circuit board 121 may be a printed circuit board (PCB) or a flexible printed circuit (FPC) board. Moreover, in this embodiment, there is a predetermined distance for arranging the light sources 120 between the bezel convex portions 113 and an inner side-wall of the back bezel 110.

Referring to FIG. 1 again, the light guide plate 130 of the present embodiment may be made by the method of injection molding, and the material thereof may be photo-curable resin, polymethylmethacrylate (PMMA) or polycarbonate (PC) for guiding the light of light sources 120 toward the liquid crystal display panel 101. The light guide plate 130 includes a light output surface 131, a light reflection surface 132 and a light input side surface 133. The light output surface 131 is formed on one side of the light guide plate 130 and faces to the liquid crystal display panel 101. The light output surface 131 may include a cloudy surface or a plurality of scattering patterns to uniform light outputted from the light guide plate 130 for preventing the situation of mura. In another embodiment, the light output surface 131 may include a plurality of protruding structures (not shown) to modify the direction of light, thereby condensing light and enhancing the brightness thereof, wherein the protruding structures may be prism-shaped structures or semicircle-shaped structures. The light reflection surface 132 is formed opposite to the light output surface 131 for reflecting light thereto. In the present embodiment, the light reflection surface 132 of the light guide plate 130 is parallel to the light output surface 131. The light reflection surface 132 may have a plurality of light guiding structures (not shown) formed thereon to guide light to the light output surface 131. The light guiding structures of the light reflection surface 132 may be a continuous V-shaped structure, i.e. V-cut structures, a cloudy surface or scattering patterns, thereby guiding the light of the light source 120 to be outputted from the light output surface 131. The light input side surface 133 may be formed on one side or two opposite sides of the light guide plate 130 and corresponding to the light source 120 for allowing the light emitted by the light source 120 to be inputted into the light guide plate 130. The light input side surface 133 may have V-shaped structures (V-cut structures), S-shaped structures or a rough surface structure (not shown) to raise light incidence efficiency and light coupling efficiency.

In this embodiment, referring to FIG. 2 and FIG. 3, the light guide plate 130 further includes a plurality of recesses 134, and the recesses 134 are formed on the light reflection surface 132 and connected to the light input side surface 133. A shape of the recesses 134 preferably corresponds to a shape of the bezel convex portions 113 of the back bezel 110, such that the bezel convex portions of the back bezel 110 can be fitted into the recesses 134 of the light guide plate 130. Therefore, with the use of the bezel convex portions 113 of the back bezel 110 and the recesses 134 of the light guide plate 130, the light guide plate 130 can be easily disposed and positioned on the back bezel 110. Further, a weight of the light guide plate 130 can be reduced by the recesses 134 for reducing a weight of the backlight module 100.

Referring to FIG. 1 again, the reflective layer 140 (or a reflective sheet) of the present embodiment is preferably formed on the light reflection surface 132 (including surfaces of the recesses 134) of the light guide plate 130, and merely exposes the light input side surface 133 for allowing light to be inputted and the light output surface 131 allowing light to be outputted. The reflective layer 140 may be made of a highly reflective material, such as any combination of alloys Ag, Al, Au, Cr, Cu, In, Ir, Ni, Pt, Re, Rh, Sn, Ta, W, Mn, and a white reflective paint with etiolation-resistant and heat-resistant properties or any combination thereof for reflecting light.

Referring to FIG. 1 again, the optical film 150 of the present embodiment may be a diffuser, a prism sheet, a turning prism sheet, a brightness enhancement film (BEF), a dual brightness enhancement film (DBEF), a diffused reflective polarizer film (DRPF) or any combination thereof disposed above the light guide plate 130 for improving the light outputted from the light guide plate 130.

Referring to FIG. 1 and FIG. 2 again, positions of the bezel concave portions 114 of the back bezel 110 can be determined according to positions of the light sources 120. That is, at least portions of the bezel concave portions 114 are positioned close to the light sources 120 for facilitating the heat dissipation of the light sources 120, as well as solving the heat concentration problem. In this embodiment, the light sources 120 can be merely disposed at one side of the light guide plate 130, i.e. one side of the back bezel 110. At this time, the bezel concave portions 114 may be formed on the rear surface of the back bezel 110 (the second surface 112) and arranged near the light sources 120 for facilitating the heat dissipation of the light sources 120, as well as homogenizing the temperature distribution of the back bezel 110.

In this embodiment, referring to FIG. 2 and FIG. 3 again, when the light sources 120 are LEDs, the recesses 134 of the light guide plate 130 are positioned between the light sources 120, and a width of each of the recesses 134 is less than an interval between the light sources 120, so as to prevent the light from being blocked by the recesses 134. At this time, the recesses 134 are connected to the light input side surface 133, and side surfaces of the recesses 134 can act as obliquely reflective surfaces for reflecting light rays between the light sources 120 toward the light output surface 131, thereby increasing the light output intensity in the spaces between the light sources 120. Thus, the light intensity of the light sources 120 can be distributed evenly, so as to mitigate an uneven light distribution problem between the light sources 120, i.e. the hot spot problem between the light sources 120. In addition, the side surfaces of the recesses 134 can be obliquely flat surfaces or obliquely curved surfaces. An angle between the side surface of each of the recesses 134 and the light reflection surface 132 is in a range of 90 degrees to 175 degrees, such as in a range of 135 degrees to 165 degrees or in a range of 135 degrees to 157.5 degrees, so as to effectively reflect the light rays between the light sources 120 toward the liquid crystal display panel 101 for mitigating the hot spot problem.

Referring to FIG. 2 again, a shape, density, or quantity of the bezel concave portions 114 of the back bezel 110 can be determined according to the temperature distribution of the backlight module 100. After the positions of the light sources 120 at the back bezel 110 is determined and the light sources 120 have worked for a predetermined time, the backlight module 100 can have a specific heat distribution (temperature distribution diagram). For example, the backlight module, which has the light sources disposed at one side of the back bezel, may have a substantially triangular heat distribution. At this time, in the present embodiment, the bezel concave portions 114 can be arranged as a triangular shape corresponding to the heat concentration of the back bezel 110 (the high-temperature region of the temperature distribution diagram) to increase the heat dissipation area of a center region of the back bezel 110, thereby improving the heat dissipation of the back bezel 110, as well as homogenizing the temperature distribution thereof. However, according to the heat distribution of the backlight module 100, the bezel concave portions 114 may be arranged as other shapes but not limited to the above-mentioned description.

When the light sources 120 of the backlight module 100 provide the backlight for the display panel 101, due to the bezel concave portions 114 formed on the rear surface of the back bezel 110 and close to the light sources 120, the heat-dissipation effect which is formed close to the light sources 120 can be improved to prevent the heat concentration of the light sources 120 and to enhance a luminous efficiency thereof. Therefore, the back bezel 110 of the backlight module 100 can improve the heat-dissipation effect and homogenize the temperature distribution thereof to enhance the display quality of the display apparatus.

Figure 4:
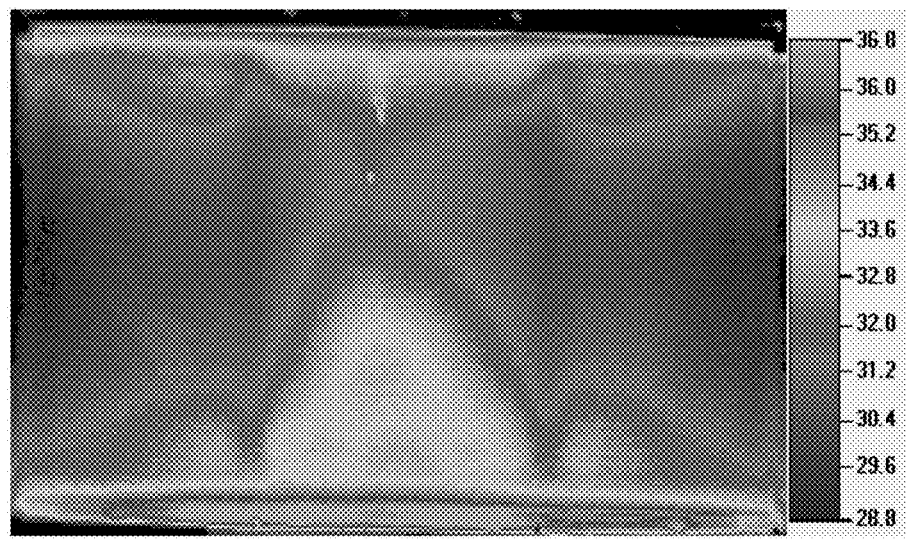
FIG. 4 is a temperature distribution diagram of the backlight module according to another embodiment of the present invention.
Figure 5:
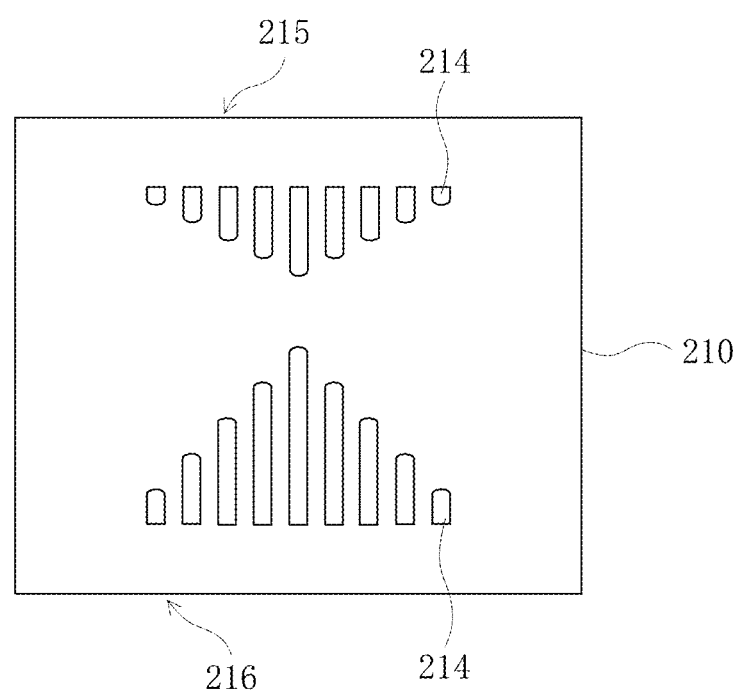
FIG. 5 is a bottom view showing the back bezel according to another embodiment of the present invention.

Referring to FIG. 4 and FIG. 5, FIG. 4 is a temperature distribution diagram of the backlight module according to another embodiment of the present invention, and FIG. 5 is a bottom view showing the back bezel according to another embodiment of the present invention. In another embodiment, the light sources 120 can be disposed at a first side 215 and a second side 216 opposite thereto, and the light guide plate 130 is disposed between the light sources 120. The bezel concave portions 214 of the back bezel 210 are formed close to the first side 215 and the second side 216, respectively, so as to increase the heat dissipation area close to the first side 215 and the second side 216 of the back bezel 110 for facilitating the heat dissipation of the light sources 120. Moreover, the position, shape, density or quantity of an arrangement of the bezel concave portions 214 of the back bezel 210 can be determined according to the temperature distribution diagram of the back bezel 210. The temperature distribution diagram is predetermined before forming the bezel concave portions 214 on the back bezel 210. The temperature distribution diagram can be obtained by using a thermal detector and is used to show the temperature distribution of the back bezel 210 before forming the bezel concave portions 214. For example, when the display apparatus is in a stand state and turned on, the first side 215 and second side 216 are positioned at the top and bottom of the display apparatus, respectively.

At this time, from the temperature distribution diagram of the backlight module (the back bezel 210), the high-temperature regions (referring to FIG. 4, the temperature in the high-temperature regions is substantially greater than 32° C.) of the back bezel 210 are formed close to the first side 215 and the second side 216, respectively, and the high-temperature regions are substantially in triangular shape. Therefore, the bezel concave portions 214 are formed at the first side 215 and the second side 216 and arranged as triangular shapes. Furthermore, since the heat dissipation effect at the top of the standing display apparatus is better, the area, density or quantity of the arrangement of the bezel concave portions 214 formed at the first side 215 (corresponding to the top of the display apparatus) of the back bezel 210 can be less than the area, density or quantity of another arrangement of the bezel concave portions 214 formed at the second side 216 (corresponding to the bottom of the display apparatus). Accordingly, the bezel concave portions 214 can be arranged according to the predetermined temperature distribution diagram for homogenizing the heat dissipation of the backlight module and enhancing the display quality of the display apparatus.

As described above, in the backlight module and the display apparatus of the present invention, the heat dissipation area can be enlarged by the c bezel concave portions of the back bezel. Furthermore, the arrangement of the bezel concave portions is determined according to the position of the light source for efficiently dissipating the heat thereof as well as mitigating the heat concentration problem thereof. In addition, with the use of the recesses of the light guide plate, the light guide plate can be easily disposed and positioned on the back bezel, and the weight of the light guide plate can be reduced. Moreover, the obliquely reflective surfaces can be formed on the recesses of the light guide plate to mitigate an uneven light distribution problem between the light sources, thereby enhancing a light distribution uniformity of the backlight module.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising:
   a back bezel having a first surface and a second surface opposite thereto, wherein the back bezel includes a plurality of bezel convex portions and a plurality of corresponding bezel concave portions, and the bezel convex portions are formed on the first surface, and the bezel concave portions are formed on the second surface;
   a light guide plate disposed on the first surface, wherein the light guide plate includes a plurality of recesses, the bezel convex portions of the back bezel are fitted into the recesses of the light guide plate; and
   a plurality of light sources disposed at one side of the light guide plate.

2. The backlight module according to claim 1, wherein at least portions of the bezel concave portions are positioned in a high-temperature region of a temperature distribution diagram of the back bezel, and the temperature distribution diagram is predetermined before forming the bezel concave portions on the back bezel.

3. The backlight module according to claim 1, wherein the light sources are disposed at a first side and a second side of the back bezel, and the bezel concave portions are arranged at the first side and the second side, and the bezel concave portions are arranged as triangular shapes.

4. The backlight module according to claim 3, wherein an area, density or quantity of an arrangement of the bezel concave portions formed at the first side is less than an area, density or quantity of another arrangement of the bezel concave portions formed at the second side.

5. The backlight module according to claim 1, wherein the recesses of the light guide plate are positioned between the light sources, and a width of each of the recesses is less than an interval between the light sources.

6. The backlight module according to claim 1, wherein an angle between a side surface of each of the recesses and a light reflection surface is in a range of 90 degrees to 175 degrees.

7. The backlight module according to claim 6, wherein the angle between the side surface of each of the recesses and the light reflection surface is in a range of 135 degrees to 165 degrees.

8. The backlight module according to claim 1, wherein side surfaces of the recesses are obliquely flat surfaces or obliquely curved surfaces.

9. The backlight module according to claim 1, wherein the light sources are disposed at one side of the back bezel, and the bezel concave portions are arranged as a triangular shape.

10. A display apparatus, comprising:
    a display panel; and
    a backlight module comprising:
        a back bezel having a first surface and a second surface opposite thereto, wherein the back bezel includes a plurality of bezel convex portions and a plurality of corresponding bezel concave portions, and the bezel convex portions are formed on the first surface, and the bezel concave portions are formed on the second surface;
        a light guide plate disposed on the first surface, wherein the light guide plate includes a plurality of recesses, the bezel convex portions of the back bezel are fitted into the recesses of the light guide plate; and
        a plurality of light sources disposed at one side of the light guide plate.

11. A backlight module, comprising:
    a back bezel having a first surface and a second surface opposite thereto, wherein the back bezel includes a plurality of bezel convex portions and a plurality of corresponding bezel concave portions, and the bezel convex portions are formed on the first surface, and the bezel concave portions are formed on the second surface;
    a light guide plate disposed on the first surface, wherein the light guide plate includes a plurality of recesses, the bezel convex portions of the back bezel are fitted into the recesses of the light guide plate; and
    a plurality of light sources disposed at one side of the light guide plate, wherein the recesses of the light guide plate are positioned between the light sources, and a width of each of the recesses is less than an interval between the light sources, and an angle between a side surface of each of the recesses and a light reflection surface is in a range of 90 degrees to 175 degrees.

12. The backlight module according to claim 11, wherein at least portions of the bezel concave portions are positioned in a high-temperature region of a temperature distribution diagram of the back bezel, and the temperature distribution diagram is predetermined before forming the bezel concave portions on the back bezel.

13. The backlight module according to claim 11, wherein the light sources are disposed at a first side and a second side of the back bezel, and the bezel concave portions are arranged at the first side and the second side, and the bezel concave portions are arranged as triangular shapes.

14. The backlight module according to claim 13, wherein an area, density or quantity of an arrangement of the bezel concave portions formed at the first side is less than an area, density or quantity of another arrangement of the bezel concave portions formed at the second side.

15. The backlight module according to claim 11, wherein the angle between the side surface of each of the recesses and the light reflection surface is in a range of 135 degrees to 165 degrees.

16. The backlight module according to claim 11, wherein side surfaces of the recesses are obliquely flat surfaces or obliquely curved surfaces.

17. The backlight module according to claim 11, wherein the light sources are disposed at one side of the back bezel, and the bezel concave portions are arranged as a triangular shape.

* * * * *